(12) United States Patent
Murfin

(10) Patent No.: US 7,341,400 B2
(45) Date of Patent: Mar. 11, 2008

(54) SUSTAINABLE SURFACE WATER DISPOSAL SYSTEM

(76) Inventor: Quintin Anthony Murfin, Rue St. Martin, Rosewood La Longue, Jersey, Channel Islands (GB) JE3 6ED ( * ) Notice: Subject to any disclaimer, the term of this patent is extended or adjusted under 35 U.S.C. 154(b) by 0 days.

(21) Appl. No.: 10/571,040

(22) PCT Filed: Sep. 22, 2004

(86) PCT No.: PCT/GB2004/004115
§ 371 (c)(1),
(2), (4) Date: Mar. 7, 2006

(87) PCT Pub. No.: WO2005/035887
PCT Pub. Date: Apr. 21, 2005

(65) Prior Publication Data
US 2007/0031192 A1    Feb. 8, 2007

(30) Foreign Application Priority Data
Oct. 7, 2003  (GB) ................................. 0323390.5
Feb. 18, 2004 (GB) ................................. 0403649.7
Jul. 9, 2004   (GB) ................................. 0415409.2

(51) Int. Cl.
*E03F 1/00* (2006.01)
(52) U.S. Cl. ........................................... 405/36; 404/2
(58) Field of Classification Search .............. 405/36, 405/43, 50; 404/2
See application file for complete search history.

(56) References Cited
U.S. PATENT DOCUMENTS 3,378,018 A * 4/1968 Lawter ....................... 134/109

4,039,451 A    8/1977  Smith (Continued)

FOREIGN PATENT DOCUMENTS

DE        298 23 806        12/1999

(Continued)

OTHER PUBLICATIONS

Pratt, CJ; "Sustainable Urban Drainage Systems Symposium—Part 2: The Difficulties and the Opportunities," The Chartered Institution of Water and Environmental Management, West Midlands Branch; Midlands Engineering Centre, Austin Court, Birmingham, Jan. 31, 2001.

(Continued)

*Primary Examiner*—John Kreck
(74) *Attorney, Agent, or Firm*—Kirkpatrick & Lockhart Preston Gates Ellis LLP

(57) ABSTRACT

A water storage cell (2) is positioned underneath a pavement (4). An upper boundary of the cell (2) is formed by a surface (6) or wearing course of the pavement (4). The remaining boundary of the cell is defined by a water-retaining layer (8) that may pen-nit infiltration of water into the surrounding ground. Means for enhancing the evaporation rate of the water in the cell are provided. As shown a ventilated pathway (20) extends between a vent (22) and a flue (24) and is surrounded by means such as a liner, suspended dished panels, absorbent mats (32) or particulate material with surface absorbency characteristics to detain water in contact with the airflow in the pathway (20). The cell (2) can be used in a SUDS system without an outfall with both permeable and impermeable pavements.

2 Claims, 5 Drawing Sheets

U.S. PATENT DOCUMENTS 4,971,690 A    11/1990    Justice

FOREIGN PATENT DOCUMENTS

| JP | 07279481 A | * | 10/1995 |
| WO | 96/12067 | | 4/1996 |

OTHER PUBLICATIONS

International Preliminary Report on Patentability of the International Bureau of the PCT for International Application No. PCT/GB2004/004115, dated Apr. 20, 2006.

English Translation of German Patent: DE 298 23 806 U1 (Previously submitted as citation B1 on Mar. 7, 2006.).

* cited by examiner

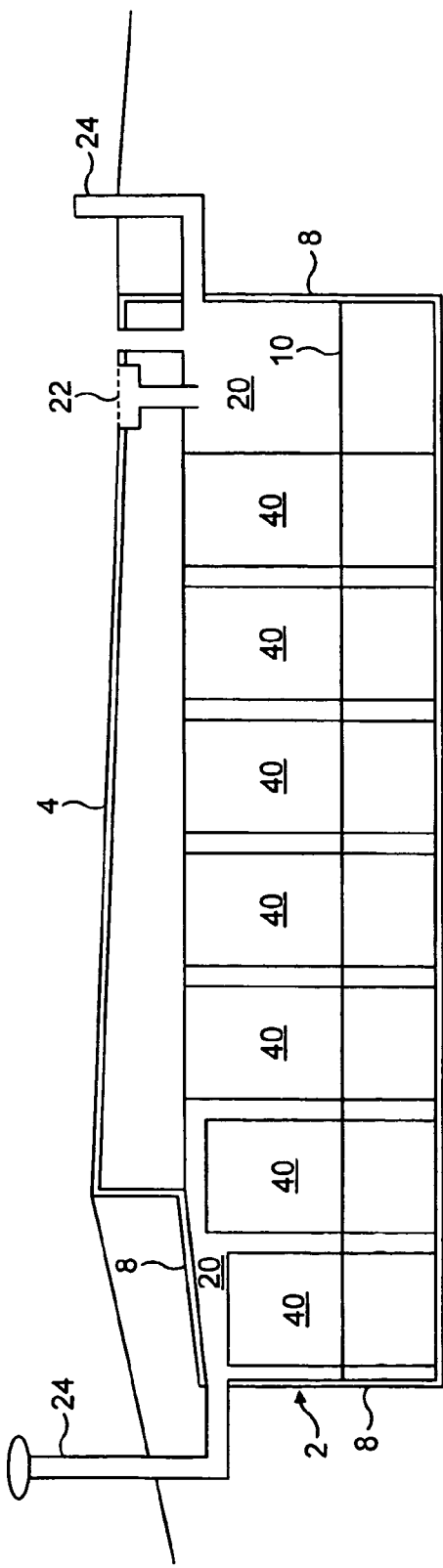
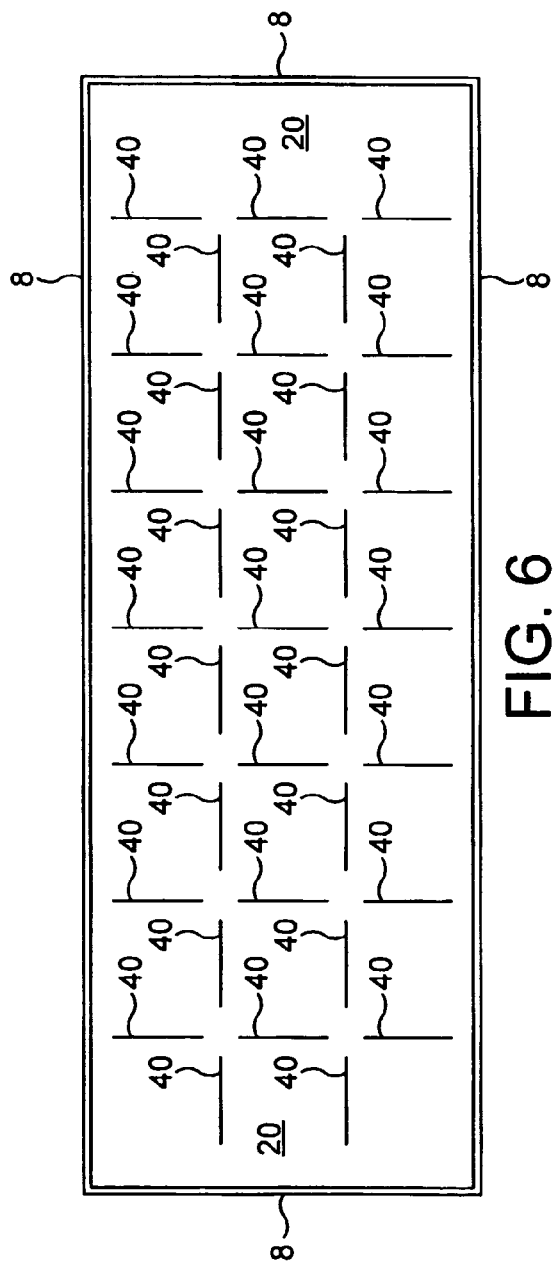

US 7,341,400 B2

SUSTAINABLE SURFACE WATER DISPOSAL SYSTEM

CROSS-REFERENCE TO RELATED APPLICATIONS

This application is the national phase of International (PCT) patent Application Serial No. PCT/GB2004/004115, filed Sep. 22, 2004, published under PCT Article 21(2) in English, which claims priority to and the benefit of Great Britain Patent Application Serial No. 0323390.5, filed Oct. 7, 2003, Great Britain Patent Application Serial No. 0403649.7, filed Feb. 18, 2004, and Great Britain Patent Application Serial No. 0415409.2, filed Jul. 9, 2004, the disclosures of which are incorporated herein by reference.

BACKGROUND OF THE INVENTION

The present invention relates to sustainable surface water drainage. Sustainable Urban Drainage Systems (SUDS) is a term that refers to drainage systems that are environmentally sustainable rather than those that require the removal, remote treatment and disposal of large quantities of water using sewers and treatment processes. Typical SUDS devices used for on-site water management are swales and infiltration basins.

The objective of SUDS is to reduce the volume of surface water requiring disposal to the adjoining aquatic environment. This reduces the risk of watercourses and culverts downstream flooding the environment.

The need for SUDS arises when large surface areas are paved, such as by roads, car parks, airports, distribution centers and the like. These paved surfaces are described herein as pavements. They are normally required to be load bearing.

Runoff water from adjacent impermeable roofs also contributes to surface water runoff from pavements.

TECHNICAL PROBLEMS

Paving over areas for human activities generally increases the runoff of surface water following rainfall compared to vegetated surfaces. The runoff is greatest at times of high rainfall storm events and needs to be managed to prevent flooding of the surface, adjoining areas and potentially downstream areas within the receiving catchment. Flooding can cause damage to property and inconvenience. Human activities such as fire service training or vehicle washing can also apply large volumes of water to a pavement and thus increase the runoff.

Pollution of the aquatic environment by water drained from pavements is also a problem. Many pavements are subject to the deposition of pollution. Pavements for vehicular use, such as road carriageways, car parks and airports, and those used for industrial activity generally produce some form of pollution that is carried off the surface by precipitation or wash down generated water runoff. The pollutants carried off the surface can pollute the catchment, or, to mitigate this, require the treatment of large quantities of surface water with relatively low pollution levels. The associated cost of treatment is generally in proportion to the volume involved.

Spillages of chemicals on the surface of the pavement may also cause polluted runoff to the adjoining aquatic environment and cause pollution unless controlled by closed storage containment systems.

In vegetated surfaces the organic soil structure detains some of the water derived from precipitation, which is returned to the atmosphere by evaporation from the soil surface and the transpiration of plants. This process has a climatic influence. Most paved surfaces are designed to minimize the surface absorption of rainwater to minimize winter icing risks. Thus the paving of surfaces has a micro climatic effect. Only a small proportion of rainfall does not run off paved surfaces because it is absorbed in the surface and evaporates off after the rainfall event due to the action of wind generated airflow and solar heat gain during daylight.

The present invention addresses the simultaneous solution of all three of these technical problems.

PRIOR ART SOLUTIONS

Professor Pratt of Coventry University has described a paving system for spillage and flood management in WO96/12067, equivalent to GB-A-2294077 and U.S. Pat. No. 6,146,051. This system is an example of an infiltration basin and uses a perforated pavement that covers a deep substrate of mainly hard nodules or shells, which is contained within impervious walls in order to form a tank. Water is stored within the substrate and can be discharged from an outlet in the base of the tank.

The Pratt tank reduces peaks in the outlet flow and also enables the chemical or biochemical treatment of spillages within the substrate.

Structural components for the assembly of a SUDS system for use with a permeable pavement include synthetic geocellular structures such as those available from SEL Environmental under the trade marks PERMAVOID (R.T.M.) for perforate, polypropylene box units and PERMACEPTOR for an interception, attenuation and treatment facility.

These systems all envisage the use of a permeable pavement and some form of outlet to the natural aquatic environment.

The role of evaporation in the disposal of rainwater has also been considered by Professor Pratt in a paper given to The Chartered Institution of Water and Environmental Management Midlands Sustainable Urban Drainage Systems Symposium part 2 on 31 Jan. 2001, in which it is acknowledged that field data generated by Mantle in 1993 (in an unpublished thesis at Nottingham Trent University entitled "On Site Reduction and Attenuation of Urban Stormwater Runoff") has shown that a permeable pavement construction may evaporate significant amounts of water.

The Pratt paving system incorporates a geotextile mat sandwiched between a gravel layer immediately beneath the pavement and the substrate in the cell. The mat is intended to filter out particulates in order that they do not reduce the storage capacity of the cell. The mat, being for filtration purposes only, is not intended to detain water and being a fine weave will restrict ventilation of the lower substrate.

Evaporation as a method of disposing of treated wastewater is described in U.S. Pat. No. 4,039,451 (Smith Alvin Jack). However this is a system to which a supply of water is separately piped rather than being located beneath a pavement. The described evaporation bed has an exposed surface.

SOLUTION OF THE INVENTION

In accordance with the present invention it has been appreciated that by enhancing evaporation of runoff water incident on a pavement, and, where necessary applying water management processes, it is possible to create a system that can be designed without an outfall in order to eliminate surface water runoff contribution to flooding or pollution of the adjoining catchment. With an outfall, the system of the invention can minimize storm flows to adjoining receiving waters and reduce the volume of polluted runoff that requires disposal.

The present invention provides a storage cell for receiving water from a paved surface defining an upper boundary of the cell, a remaining boundary of the cell being defined by means of a water-retaining layer, characterized in that the cell further comprises means for enhancing the evaporation rate of the water in the cell.

There are a number of solutions for the enhancement of evaporation. Preferably a ventilated pathway extends across water detained in the base of the cell, or in suspended dished panels, absorbent mats or particulate material with surface absorbency or adsorbency characteristics to detain water in contact with the airflow in the pathway. This enhances the uptake of water by the air that flows over the surface to the outside atmosphere and thereby enhances the evaporation rate.

Evaporation can also be enhanced by lifting water from the lower part of the cell and applying it onto the pavement.

ADVANTAGES OF THE INVENTION

The use of one or more ventilated pathways allows the atmospheric processes of the flow of air, which when less than fully saturated, is able to take up water from the contacting wet surfaces and discharge this water load to the atmosphere above the pavement.

The application of water to the paved surface utilizes the ability of a wet surface exposed to sun, wind, and convective airflows to evaporate water into the contact air, when the air is not fully saturated.

Spillages of chemicals on the surface of the pavement will enter and be fully contained by the system when constructed without an outfall and may be removed by lifting out the polluted water by pumping following an incident or, if acceptable, by later removal when the polluted water volume in the cell has been reduced by evaporation. Providing a plurality of discrete cells with individual draw off points may be desirable to contain spillages within individually smaller volumes of water. The use of modular units is beneficial in this respect.

At sites where the soil below the structure has the capacity to take in water by infiltration into the soils, the boundary of the system in contact with the soil may, alternatively, be a water permeable geotextile with a pore size that prevents the migration of fines from the soil into the structure. Infiltration to ground will be appropriate only where the pollution incident on the surface of the pavement can be degraded by a biodegradation process on the surface of the pavement and by passage through the structure of the system sufficiently to produce an acceptable inflow quality to the soil for aquifer protection.

Water in excess of that lost to evaporation is stored within the cell structure and may be disposed of by harvesting the water for plant watering, domestic grey water use, or drainage to watercourse at times when the additional flow can be accommodated in the watercourse. In the case of drainage to watercourse, the outfall may be at a level in the structure that allows attenuation of the flow and dilution of pollution by the stored water within the structure to occur.

Evaporative enhancement will also help to emulate the evapotranspiration/infiltration balance that prevails in an equivalent vegetated surface benefiting the micro climate of the site.

BRIEF DESCRIPTION OF THE DRAWINGS

In order that the invention may be well understood several embodiments thereof will now be described, by way of example only, with reference to the accompanying diagrammatic drawings, in which:

FIG. 5 shows a vertical cross section through a fifth embodiment of a storage cell with an impermeable pavement;

FIG. 6 shows a possible plan layout of wicks within a storage cell of FIG. 4 or 5;

GENERAL STRUCTURAL OVERVIEW

Figure 1:
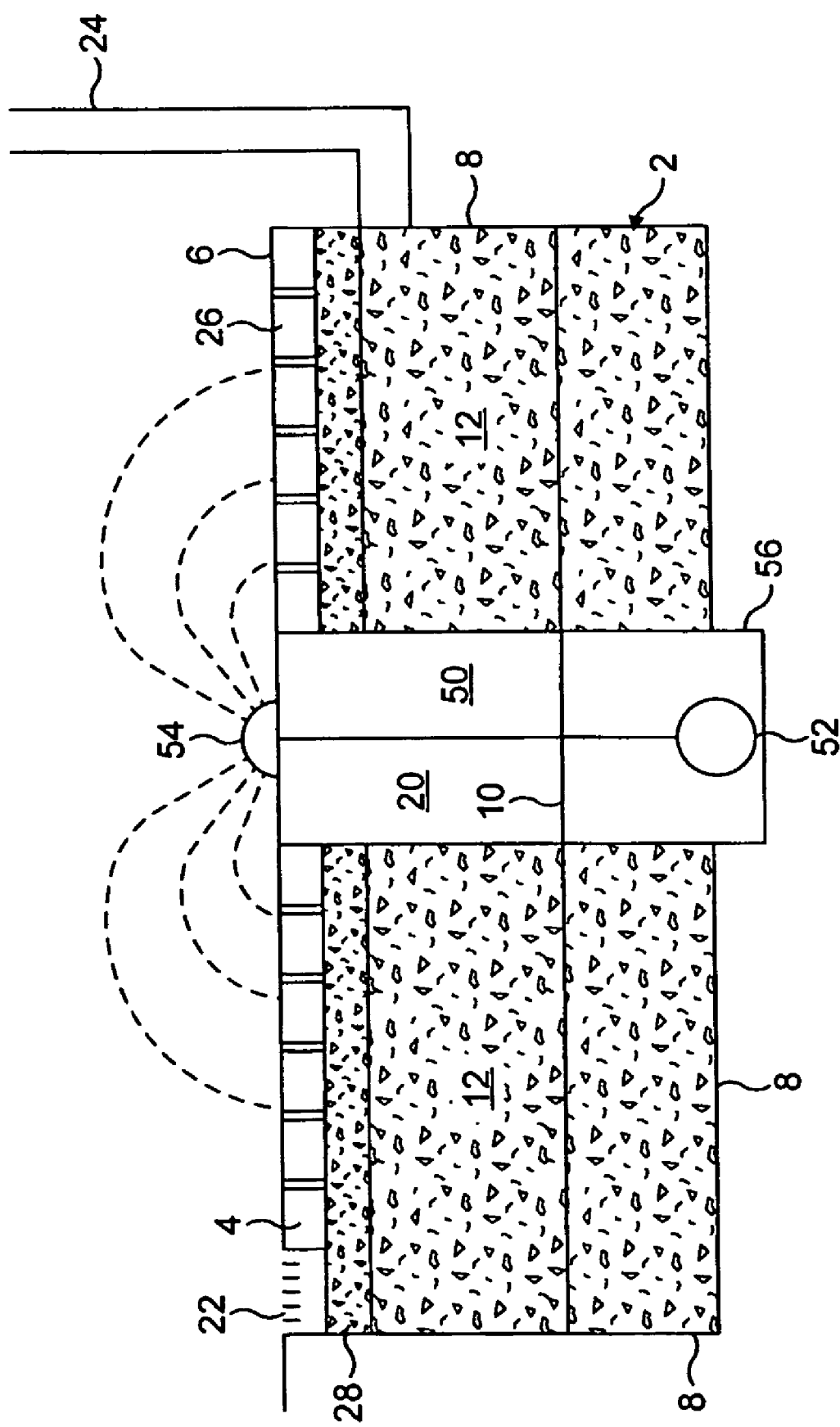
FIG. 1 shows a vertical cross section through a first embodiment of a storage cell with a water-lifting device.

A water storage cell 2 is positioned underneath a pavement 4. An upper boundary of the cell 2 is formed by a surface 6 or wearing course of the pavement. A water-retaining layer 8 defines the remaining boundary of the cell 2. The cell must have a void volume sufficient to accommodate the drained water, which will create a varying cell water level 10. The internal structure of the cell may also be defined by synthetic geocellular structures as known in the art to support the pavement and provide ventilated pathways 20. The cell may be filled with civil engineering materials 12 (e.g. open graded stone or other materials typically used in the layers of a load-bearing pavement) selected to leave a void volume large enough to accommodate the drained water. A ventilated pathway 20 extends between an air inlet vent 22 and a flue 24.

The pavement 4 may be permeable block paving, where individual blocks 26 are supported on a particulate bedding layer such as gravel 28 that allows water to pass between the blocks 26. The particulate bedding layer 28 may be omitted in certain light duty applications. If the pavement 4 has an impermeable surface 6 then all runoff water must enter the cell 2 through surface vents 22 and the pavement 4 will be laid to drain towards these vents 22. The vents 22 may be drainage channels covered with a perforated grid and also serve to ventilate the pathways 20.

The remaining boundary 8 of the cell 2 may be created by a tank wall creating a water impermeable layer. Alternatively, where infiltration to soil is required, a geotextile liner may be used that has a pore size sufficient to prevent entry of fines from the surrounding soil but sufficient to allow water to infiltrate into the remaining ground. The liner 8 may be supported by the adjacent soil or on a specially constructed structure.

The pathway 20 is defined by means of absorbent or adsorbent surfaces that detain water in contact with the airflow in the pathway 20. Different embodiments use different approaches to this. Absorption takes water into interstices of a surface. Adsorption is the attraction of water by surface tension over a surface. This phenomenon is important for evaporation from stone surfaces, as the water molecules can more readily break free (evaporate) because of the weaker attraction. The high performance of downward evaporation from an absorbent mat is believed to be due to this factor and the aid of gravity.

Detailed Description of First Embodiment

In the embodiment as illustrated in FIG. 1, the cell 2 has an internal structure, which defines a cavity 50 with permeable walls to allow water from the remainder of the cell 2 to flow into the cavity 50. The cavity 50 accommodates a pump 52. To allow the pump 52 to fully empty the cell 2 a sump 56 below the general base level of the cell 2 is provided.

Apart from the cavity 50, the cell 2 is filled with open graded material 12 or geocellular structures that define multiple pathways 20 through the material into the base of the cell 2. Water that is not evaporated as it passes through the material 12 is stored in the base of the cell and is pumped by pump 52 to an irrigation spray 54 located at the surface of the pavement for spraying the water back onto the pavement surface 6.

A permeable pavement 6 is illustrated. However, the pavement could be impermeable in which case water would drain into the cell 2 exclusively through the vents 22.

As shown in the drawing, the water is applied to the surface at surface level. However, the sprayer 54 may be elevated above the surface if usage of the pavement so allows. Alternatives to the irrigation spray 54 for applying water to the pavement may also be employed.

The device should spread the water evenly across the pavement 4 and should ensure that no water falls outside the catchment area of the system.

The water applied to the surface will evaporate and any excess percolate back through the pavement 4 into the cell 2. To maximize the efficiency of the system the rate of application by the spray 54 should closely match the evaporation rate on the surface due to the prevailing weather conditions. Factors such as surface solar heat gain, wind speed, surface heat sink and precipitation may be taken into account and used to control the operation of the pump 52 remotely by means of a computer system.

Precautions against the risk of water borne disease may be required where persons frequent the surface.

Detailed Description of Second Embodiment

Figure 2:
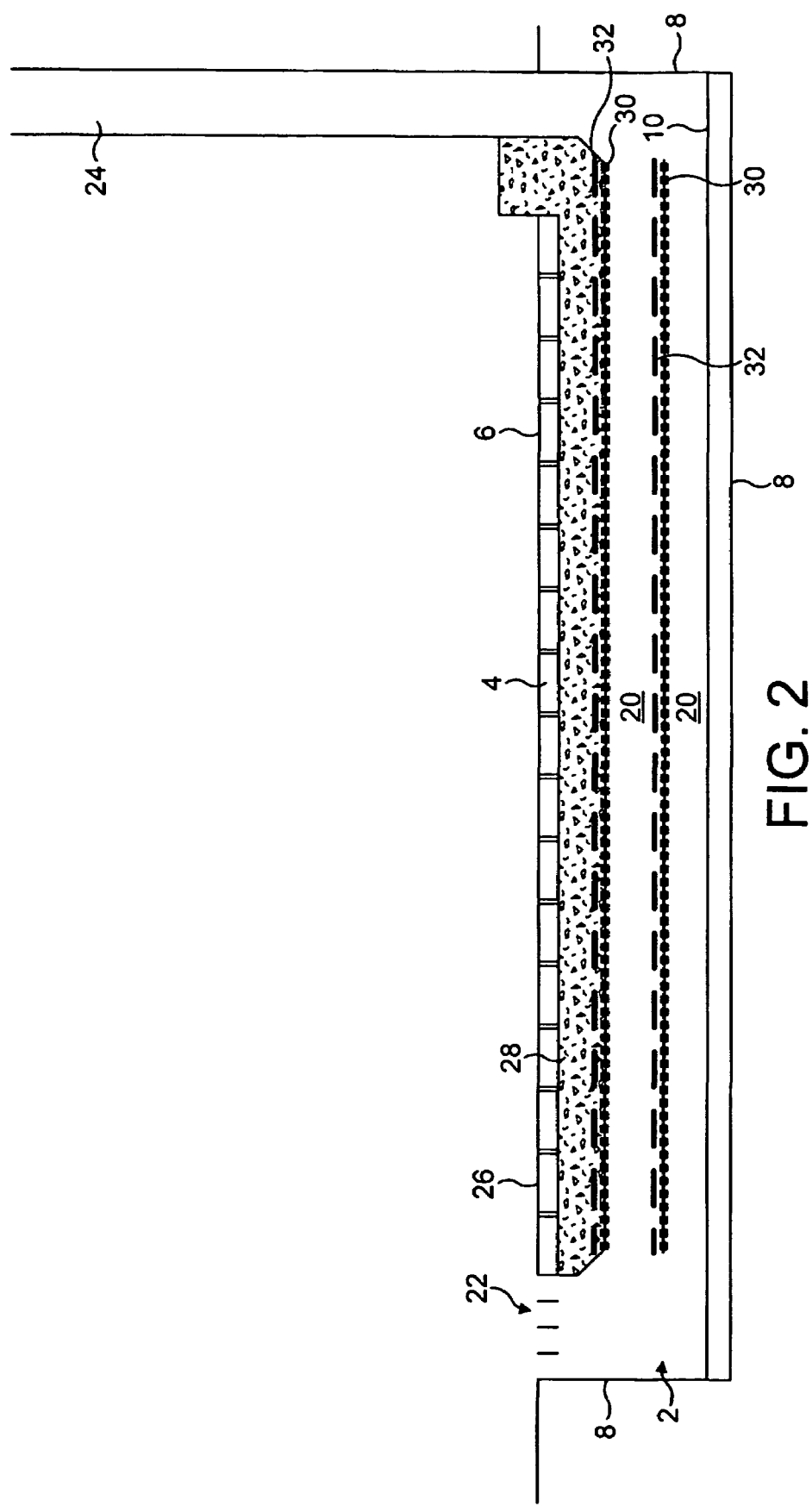
FIG. 2 shows a vertical cross section through a second embodiment of a storage cell.

In this embodiment as illustrated in FIG. 2, the interior of cell 2 contains a structural grid 30 that may be supported on perforated walls or columns (such as a synthetic geocellular structure) which rest on the lower boundary 8 of the cell 2.

The pavement 4 and grid structure 30 are designed to be able to support the intended surface activity traffic and remain serviceable for the design life of the cell. The skilled designer will appreciate the constraints this imposes on the design.

The grid 30 defines two parallel pathways 20 that extend from the vents 22 to the flue 24. It will be appreciated that only one pathway 20 is required to enhance evaporation but two should increase performance. Geo-synthetic textile mats 32 are supported on or below the grid structure 30 to act as absorbent surfaces that detain water in contact with the air flow in the pathways 20.

A suitable material for the geotextile mats is TERRAFIX 813 a very heavy-duty civil engineering geotextile, which, when saturated, holds the equivalent of 5 millimeters depth of rainfall. Prolonged rainfall will saturate the surface bedding layer gravel 28 and then water will percolate down and saturate the upper mat 32. When the geotextile mats 32 supported on an upper layer of the grid 30 have become saturated surplus water will drip down on to the lower geotextile mats 32 on the lower layer of the grid 30. The geotextile mats 32 will soak up most rainfall events but larger, consecutive storms will cause water to drip down to the cell liner at the base of the cell creating a layer of cell water as indicated in the Figure with surface level 10. Evaporation will occur upwards and downwards from the geotextile mat both into the gravel bedding 28 of the pavement and into the air pathways 20.

The water is retained in these geotextile mats 32 between the mat fibres.

Where the geotextile mats 32 are level, they will hold water over their entire horizontal extent. Where the mats 32 are inclined the degree of inclination may need to be limited to ensure that water is held by capillary action across the whole of the exposed surface of the mat rather than draining down from the more elevated end to the lower end.

The draw of the flue pipes 24 set at intervals around the edge of the pavement increases the flow of air through the pathways 20. The flue pipes 24 may be fitted with cowls that are designed to increase the wind-generated air flow rate. Forced ventilation may also be utilized.

The geotextile mats 32 are shown as being perforated to increase air flow. Continuous mats may also be employed. Where the mats are perforated and overlain with gravel 28, a finer mesh is required to prevent gravel 28 falling through. Supporting the mats 32 by suspension from the grid 30 may improve air flow contact when a finer mesh is used to support the gravel.

The grid structure 30 may also support dished panels which will hold pools of water in the pathways 20 for enhanced evaporation.

It will be appreciated that there are various modifications possible with the design of FIG. 2. For example surface vents 22 may be provided at either end of the pathways 20 instead of an elevated flue 24 at one end. The entire pavement surface could also be open grid flooring allowing ventilation over the entire area.

The system should be designed and managed to ensure that the stored water level 10 does not overtop the lowest point of the water retaining layer 8 or saturate the particulate bedding layer 28 when the pavement is in vehicular service.

Detailed Description of Third Embodiment

Figure 3:
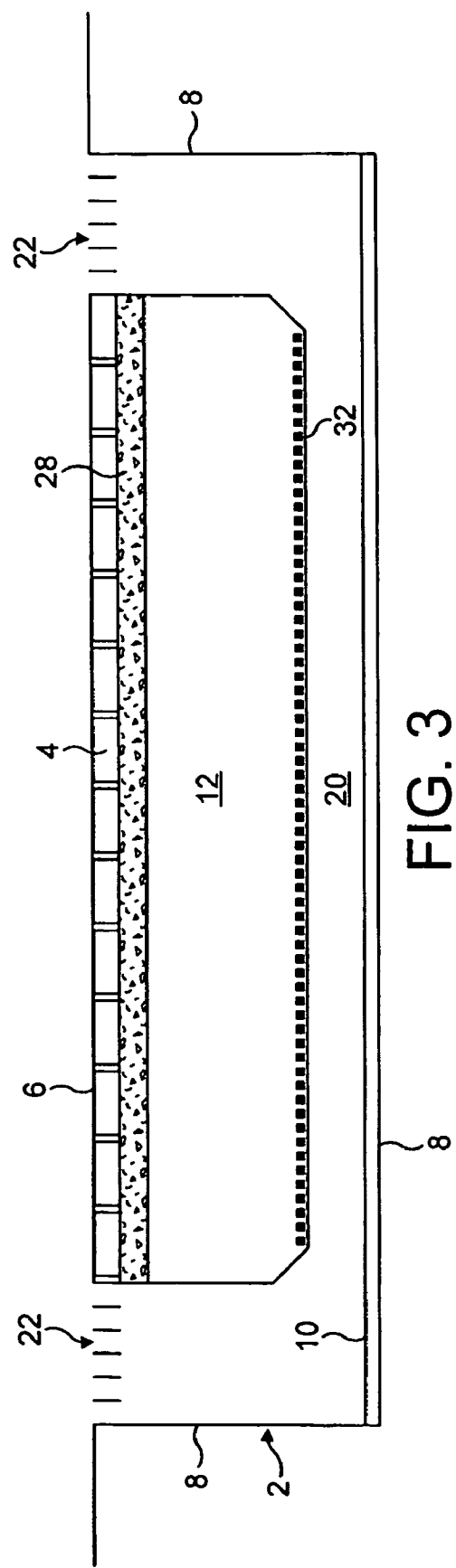
FIG. 3 shows a vertical cross section through a third embodiment of a storage cell.

In the third embodiment illustrated in FIG. 3 the body of the cell is filled with open graded particulate material 12 supported within synthetic geocellular units. A single open pathway 20 is provided between vents 22 in the pavement and additional pathways are created through the body of the material 12. The particulate material 12 absorbs and adsorbs water on its surface and has interconnection voids allowing air to circulate.

This system should be designed and managed to ensure that the stored water level 10 does not rise above the top of the water-retaining layer 8 or saturate the bedding layer 28 of the pavement 4.

A geotextile mat 32 is provided at the base of the filled lower portion of the geocellular units within the cell 2 so as to enhance evaporation into the airflow in the pathway 20. Alternatively the mat 32 may be omitted and the particulate material 12 supported by the grid 30 or geocellular structures, allowing air to flow vertically through the cell 2 as well as horizontally.

Figure 4:
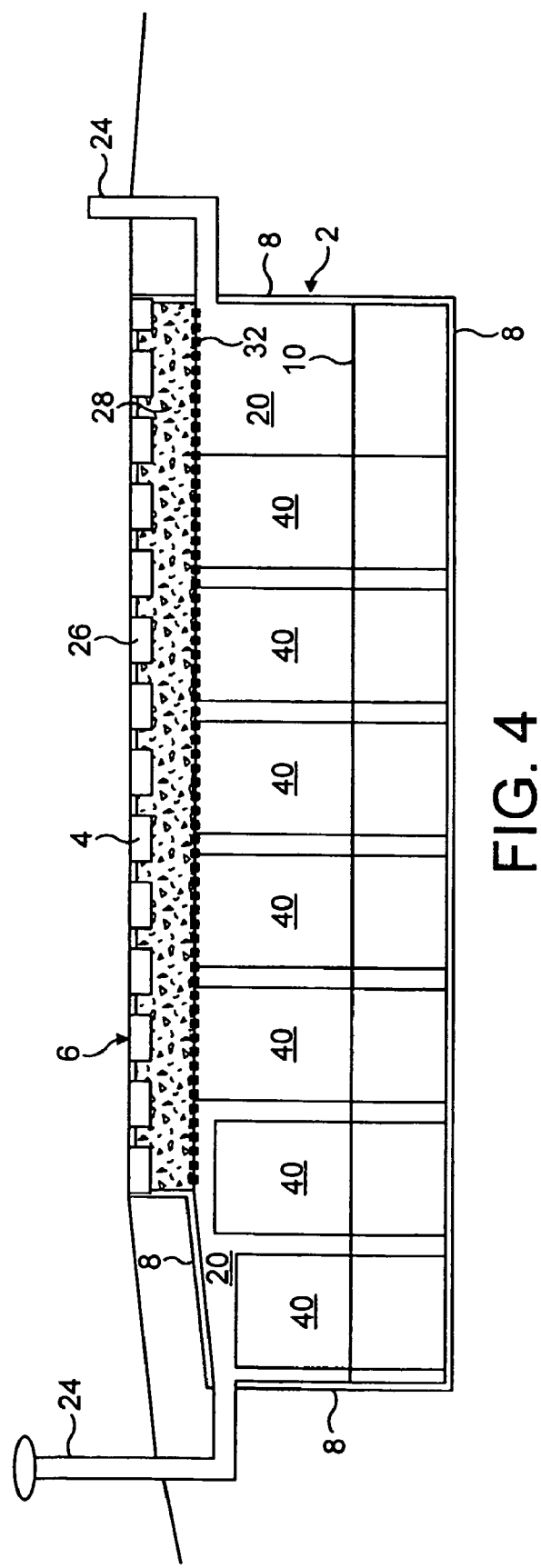
FIG. 4 shows a vertical cross section through a fourth embodiment of a storage cell with a permeable pavement.

Detailed Description of Fourth and Fifth Embodiments (FIGS. 4 to 6)

In these embodiments the same reference numerals have been used to describe similar parts. The cell 2 has the same basic structure as that previously described. The interior of the cell has a high void proportion and minimum structural elements are used to support the pavement 4. The structural elements support a horizontal geotextile mat 32 placed horizontally beneath the bedding layer 28 of the permeable pavement 4 in FIG. 4. Wicks 40 of geotextile material which are suspended in a vertical manner in an array as illustrated in FIG. 6 from a grid framework within the cell. The geotextile wicks 40 are suspended so that they are located in any water layer at the bottom of the cell. As a result of capillary lift, water retained in the base of the cell is lifted into the void ventilated pathway 20 to enable enhanced evaporation to take place.

The horizontal capillary mat 32 is perforated to allow through flow of water into the void area of the cell below.

As in the earlier embodiments air flow is created through the ventilated pathway 20 by the use of flues 24 at the edge of the cell 22. In FIG. 4, two flues 24 are shown as runoff water enters the cell through the permeable pavement layer. In the embodiment of FIG. 5 where the pavement 4 is impermeable runoff water from the pavement 4 enters the cell through drainage gulleys or channels 22. Oil traps may be provided in the drainage gulleys.

The wicks 40 may be made of a sandwich of outer capillary geotextile enclosing a finer inner material (e.g. fine graded sand or powder). This increases the capillary action lift height.

The spacing of the wicks 40 should be set to optimize the wick area for evaporation and is dependant on the capillary action lift height of the chosen wick material. For example, if wicks 40 have a capillary action lift height of 300 millimeters and are 150 millimeters wide and spaced at 300 millimeter centers in each direction, the effective wick surface evaporation area will equal the water surface area.

Design Variations

The selection of the geotextile material for mats and wicks 32, 40 is made on the basis of the capillarity properties of the material so that it detains water for the full depth of the mat in combination with a surface texture that is conducive to the evaporation process. Such non-woven geotextiles are available on the market.

Design of the cell storage should suit the climate of the locality. Design should allow for the reduction in storage volume over time due to the ingress into the system of fine material such as windblown silts and activity detritus. Any contribution to the cell of runoff from adjoining areas such as roofs or pavements that drain to the paved surface should be accounted for in the design. The effect of any biofilm to reduce evaporation from wet surfaces should also be accounted for in the design.

It will be appreciated that the design elements of the various embodiments described can be combined in combinations not otherwise illustrated.

Evaporation may also be increased by artificial means such as warming the stored water or mechanically forcing the ventilation.

Use and Maintenance

Where the system is designed to store rainfall, which is in excess of the likely level of evaporation over the course of the year—taking into account the climate of the locality and the amount of pavement and stored water evaporative surfaces—an outfall to the adjoining aquatic environment is required.

Where there is no outfall, chemical spillage on the surface of the pavement is filly contained by the system and may be removed by lifting the polluted water out by pumping following the incident or, if acceptable, by later removal when the polluted water volume in the cell has been reduced by evaporation.

Providing a plurality of discrete cells underneath a large pavement or dividing a cell into a number of discrete units with individual draw off points may be desirable to contain any spillages within the smallest volume of stored water.

Periodically, water that remains unevaporated in the cell is drawn off and this smaller quantity of distillate containing a concentrated level of pollution may be disposed of by an appropriate treatment process. Ideally this draw off should be at a time of minimum storage (such as the end of summer) to minimize the quantity of water for treatment. Where levels of pollution are lower and the biodegradation occurring in the cell renders the water suitable for re-use it may be disposed of by harvesting the water for plant watering, domestic grey water use, or drainage to watercourses. In the case of drainage to watercourses, the outfall may be at a level in the structure that allows attenuation of the flow and dilution of pollution by the stored water to occur within the structure. Evaporative enhancement will help to emulate the evapotranspiration/infiltration balance that prevails in an equivalent vegetated surface.

The effect of evaporation is to reduce the stored volume of polluted water. When the distillate becomes significantly polluted it may be drawn off (e.g. by pump or valve controlled gravity draw off point) for disposal via an appropriate treatment process.

The invention claimed is:

1. A storage cell (2) for receiving water from a paved surface (6) defining an upper boundary of the cell (2), a remaining boundary of the cell being defined by means of a water-retaining layer (8), characterised in that the cell further comprises means (52) for lifting water from a lower part of the cell (2) and means (54) located at the surface of the pavement for applying the water to the pavement surface to provide evaporation enhancement means.

2. A storage cell as claimed in claim 1, wherein the applying means comprises a spray.

\* \* \* \* \*